United States Patent
DePriest et al.

(10) Patent No.: US 9,839,211 B2
(45) Date of Patent: Dec. 12, 2017

(54) SEGMENTED BOOM SYSTEM FOR WORK VEHICLE

(71) Applicant: DEERE & COMPANY, Moline, IL (US)

(72) Inventors: Andrew E. DePriest, Melbourne, FL (US); Richard J. Chowaniec, Jr., Wyandotte, MI (US); Gregory E. Peterson, Sylvan Lake, MI (US); Gregory S. McCunn, Orion, IL (US); Jonathan J. Nelson, Davenport, IA (US); Sankaran Subramaniam, Bettendorf, IA (US); Nathan Tortorella, Cedar Falls, IA (US); Garry E. Baxter, Ankeny, IA (US); Brandon C. Carlson, Ankeny, IA (US); Kent A. Klemme, Ankeny, IA (US); Dolly Y. Wu, Silvis, IL (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 14/817,629

(22) Filed: Aug. 4, 2015

(65) Prior Publication Data

US 2016/0037764 A1 Feb. 11, 2016

Related U.S. Application Data

(60) Provisional application No. 62/035,536, filed on Aug. 11, 2014.

(51) Int. Cl.
*B05B 1/20* (2006.01)
*A01M 7/00* (2006.01)

(52) U.S. Cl.
CPC ........ *A01M 7/0075* (2013.01); *A01M 7/0071* (2013.01)

(58) Field of Classification Search
CPC ...... A01G 25/09; A01G 25/092; A01G 25/16; A01G 25/097; A01G 7/06; A01G 25/095;
(Continued)

(56) References Cited

U.S. PATENT DOCUMENTS

| | | | | |
|---|---|---|---|---|
| 4,253,579 A | * | 3/1981 | Williams | ................ B66C 23/70 52/650.2 |
| 6,779,744 B1 | * | 8/2004 | Marine | .................. B05B 1/205 239/266 |

(Continued)

OTHER PUBLICATIONS

Phillips, Rhys."Electrostatic Discharge in Carbon-Fibre Composite Aircraft Structures" [online], [retrieved on Jun. 3, 2015]. Retrieved from the Internet <URL: http://www.rhysphillips.co.uk/wp-content/uploads/2010/08/esd_in_cfc_aircraft_structures.pdf>.

*Primary Examiner* — Steven Marsh
(74) *Attorney, Agent, or Firm* — Taft Stettinius & Hollister LLP; Stephen F. Rost

(57) ABSTRACT

Embodiments of a boom system for a work vehicle has a first boom member with a plurality of first boom segments aligned lengthwise to extend along a first boom dimension and a second boom member with a plurality of second boom segments aligned lengthwise to extend in the first boom dimension and spaced from the first boom member in a second boom dimension. The boom system also has a union spanning the second boom dimension to couple the first boom member to the second boom member and having a first coupling segment joining consecutive first boom sections together and a second coupling segment joining consecutive second boom sections together.

25 Claims, 7 Drawing Sheets

(58) Field of Classification Search
CPC .... A01G 25/165; A01G 25/167; A01G 11/00;
A01G 13/06; A01G 13/065; A01G
25/023; A01G 27/003; A01G 9/24; A01G
9/246
USPC ......... 248/214, 351; 239/159–166, 722, 726,
239/728
See application file for complete search history.

(56) References Cited

U.S. PATENT DOCUMENTS

| | | | | |
|---|---|---|---|---|
| 7,150,419 | B1* | 12/2006 | Tomlonovic | A01M 7/0053 239/722 |
| 8,864,048 | B1* | 10/2014 | Light | B05B 1/20 239/159 |
| 2002/0113137 | A1* | 8/2002 | Guesdon | A01M 7/0071 239/1 |
| 2015/0367357 | A1* | 12/2015 | Humpal | B05B 1/30 239/1 |
| 2016/0255769 | A1* | 9/2016 | Leeb | A01C 23/007 |
| 2016/0264384 | A1* | 9/2016 | Roodenburg | B66C 23/70 |
| 2016/0324137 | A1* | 11/2016 | Mellin | A01C 23/047 |

\* cited by examiner

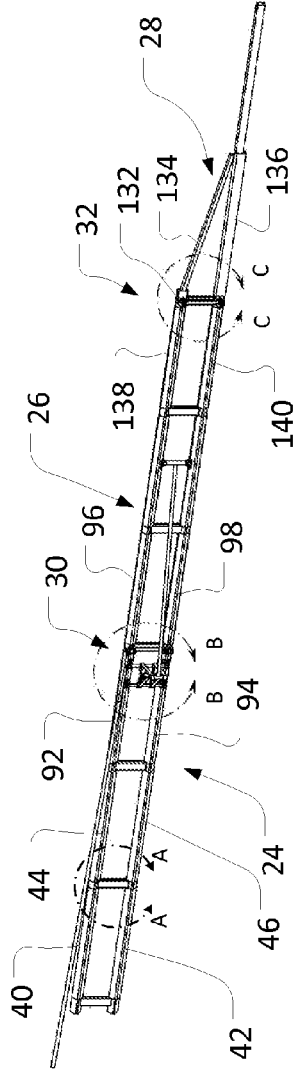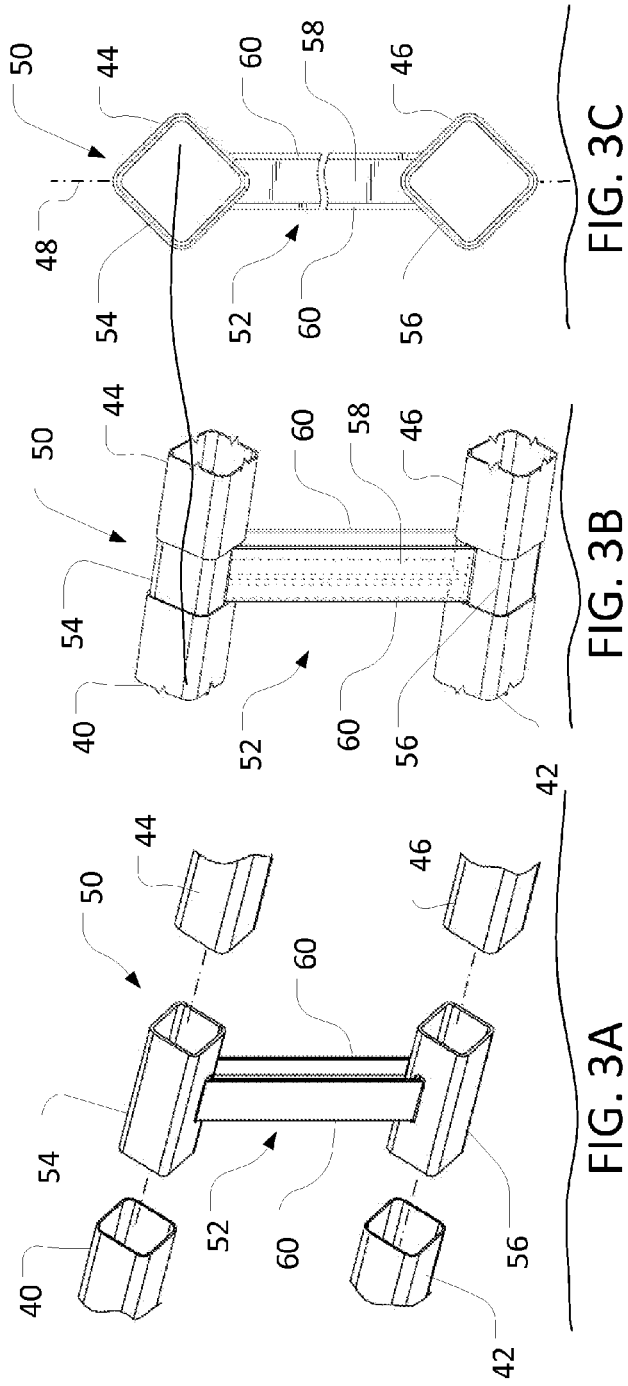

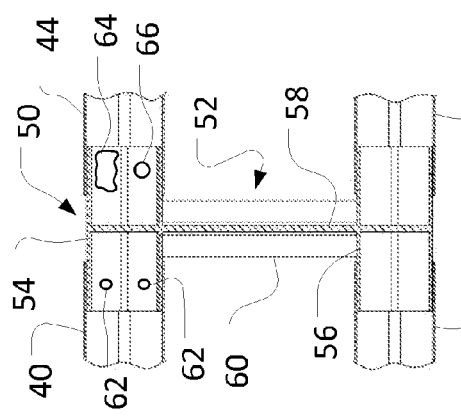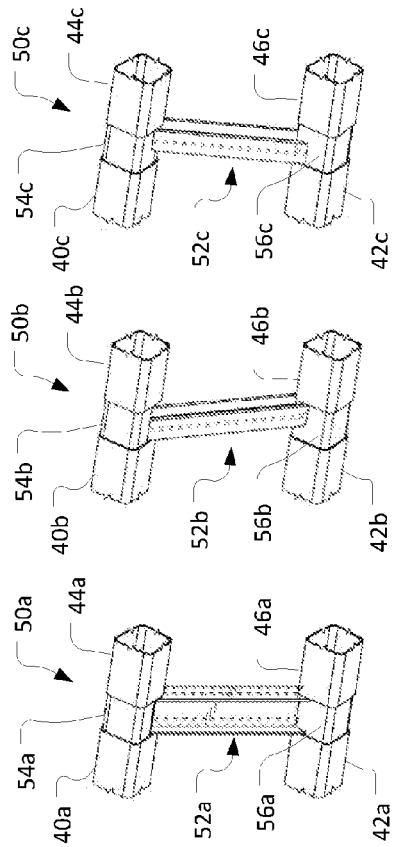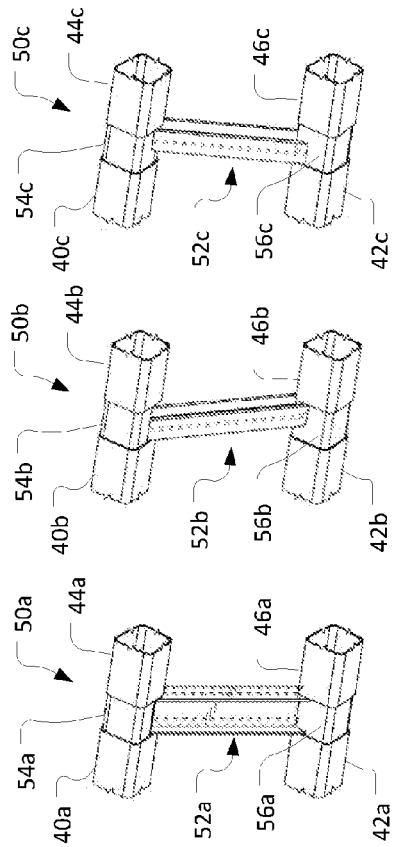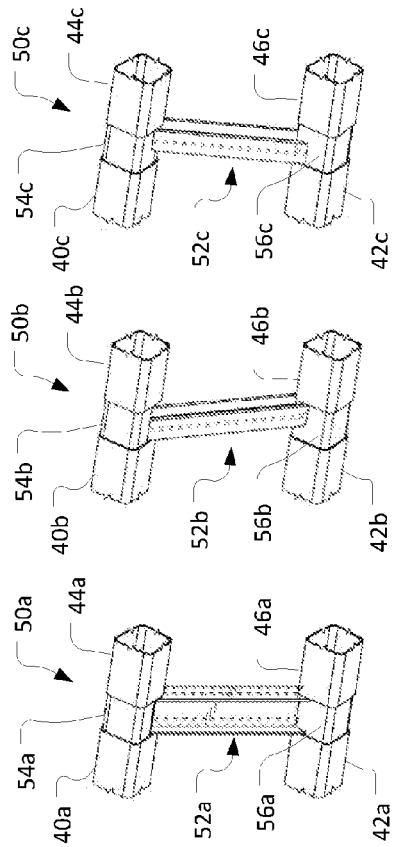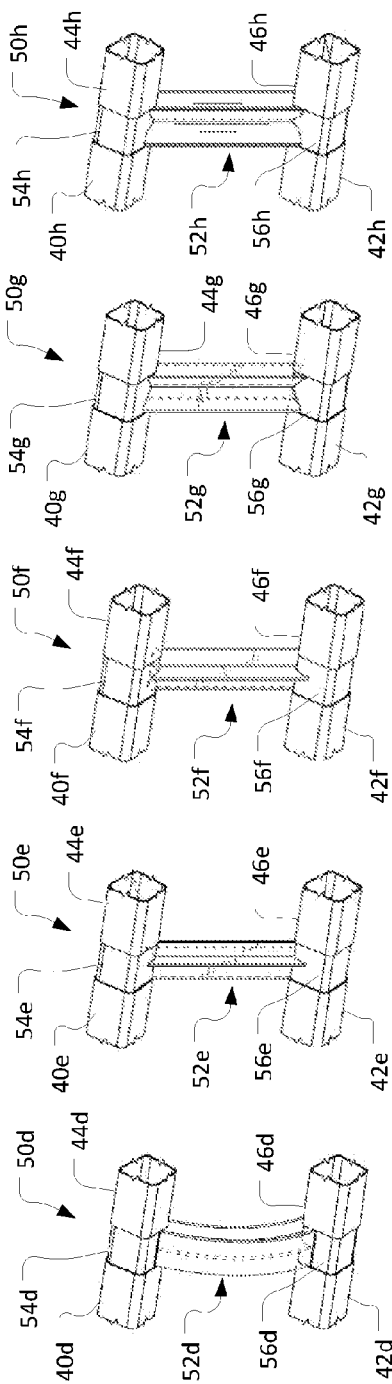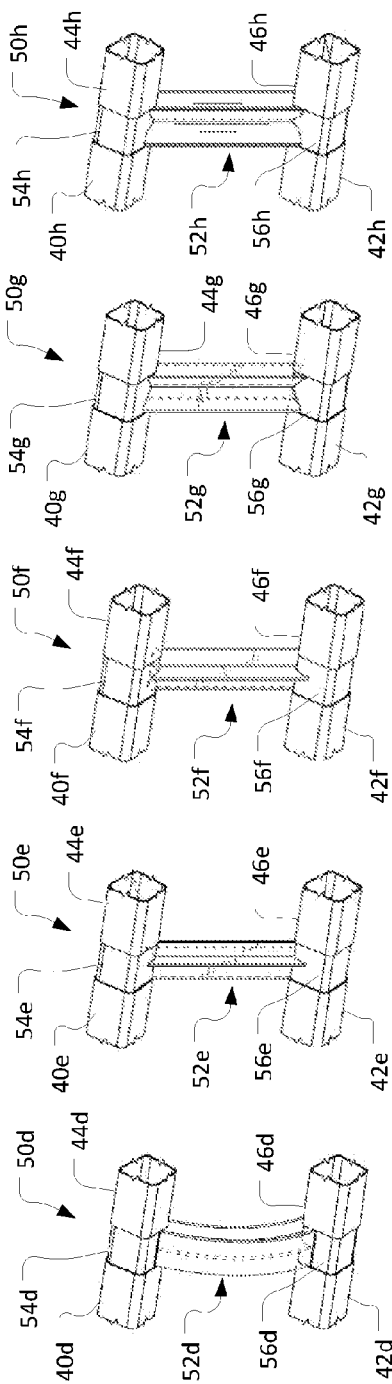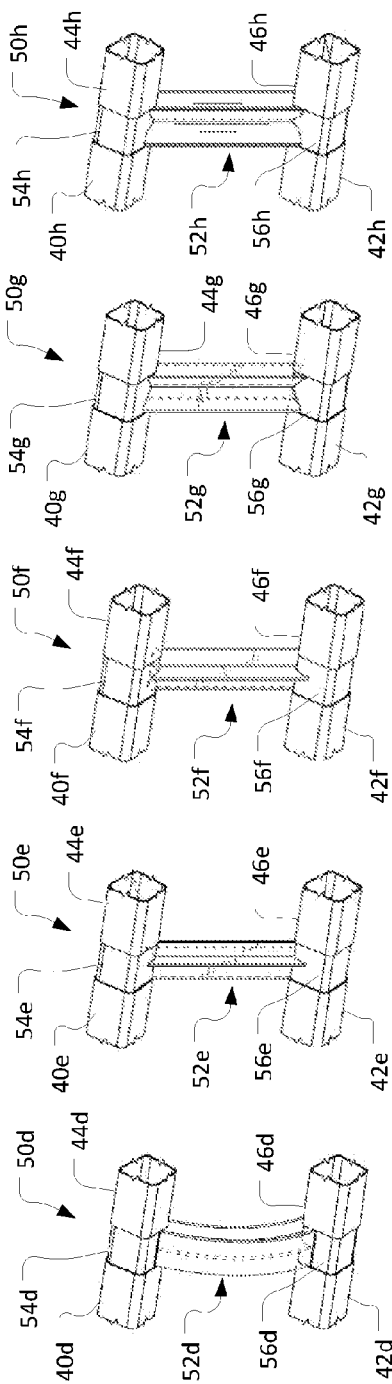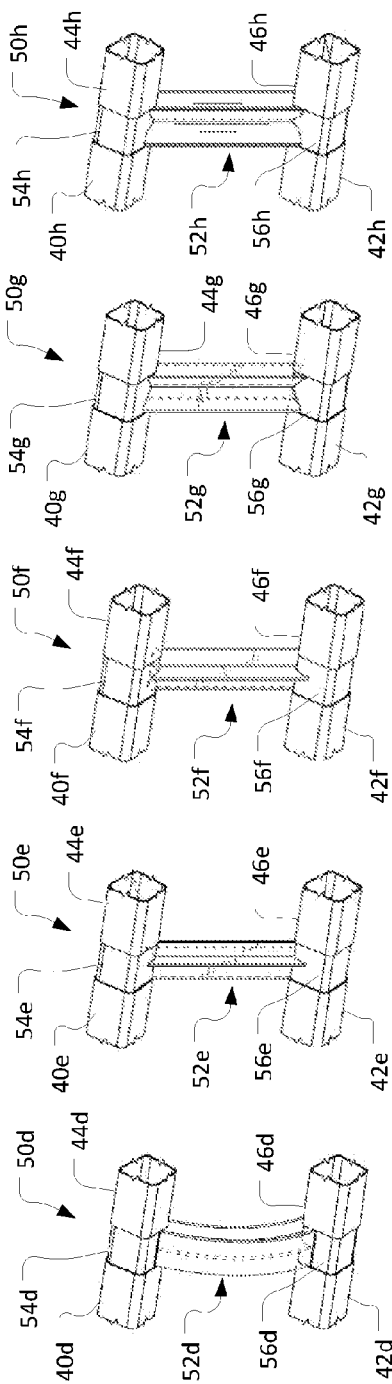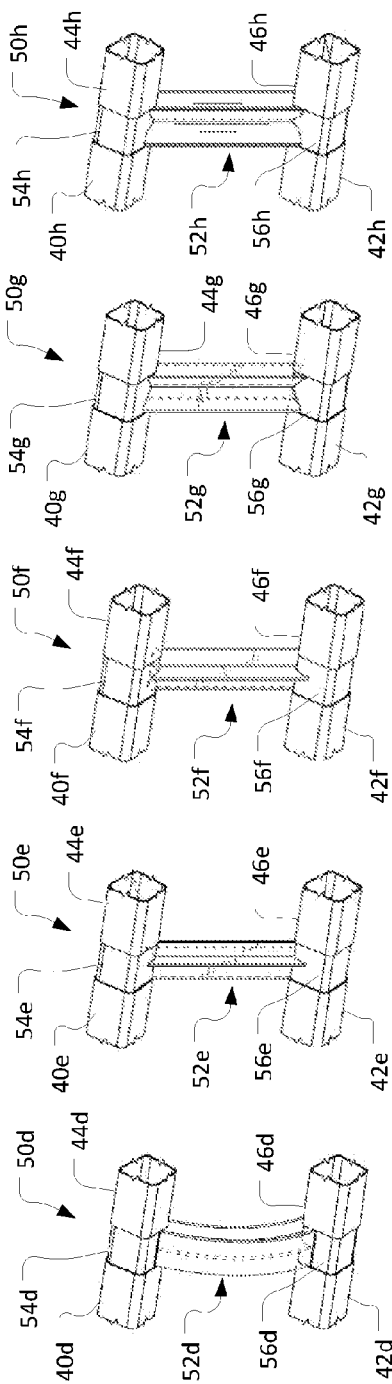

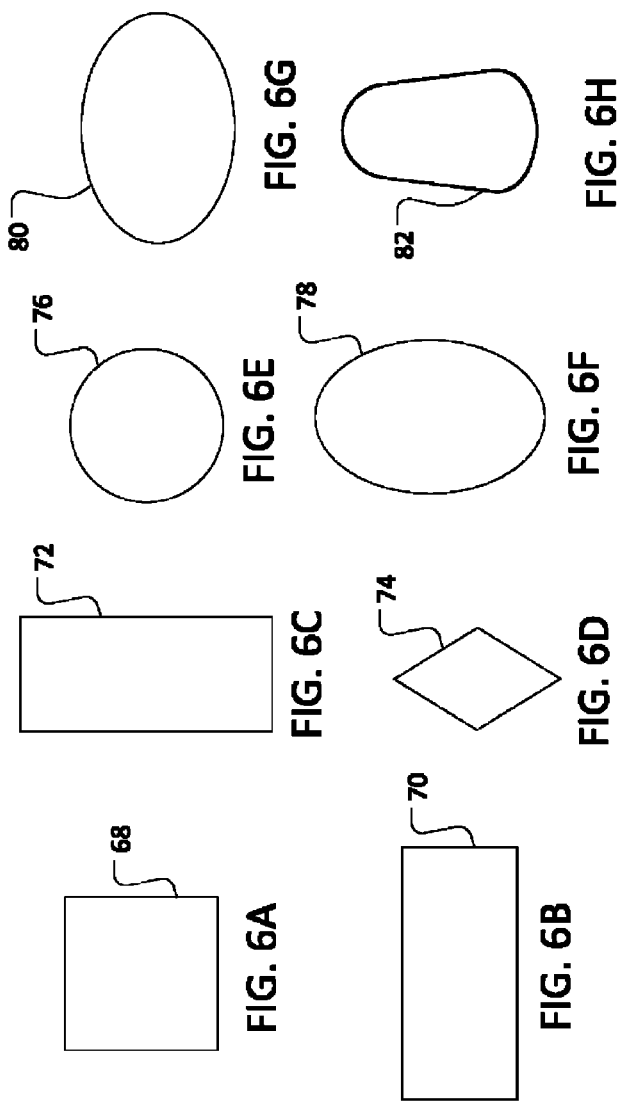

SEGMENTED BOOM SYSTEM FOR WORK VEHICLE

CROSS-REFERENCE TO RELATED APPLICATION(S)

This application claims priority to U.S. Provisional Patent Application No. 62/035,536, which was filed on Aug. 11, 2014, titled FLUID SPRAYER WITH COMPOSITE-MATERIAL BOOM SYSTEM, the contents of which are incorporated in here by reference.

FIELD

This disclosure relates to booms for work vehicles, and in particular to segmented boom systems.

BACKGROUND

Various work vehicles have boom systems for extending the reach of the work vehicle. In the agricultural industry, for example, self-propelled sprayers may have long, folding booms that extend from lateral sides of the vehicle perpendicular to the direction of travel of the machine. In the case of agricultural sprayers, the booms support fluid lines and spray nozzles for delivering a spray solution or other material to the sides of the vehicle low to the ground and at a wide swath of the field being treated.

Conventional booms for agricultural sprayers may use long lengths of heavy gauge steel members to span long distances of field (e.g., 100 feet or more). A truss-work arrangement may be employed to support the bending loads on the long members of the boom. The heavy boom members, along with the heavy fluid and fluid distribution pipes and the associated truss arrangement, may take considerable time to fold and unfold. The weight also causes ground compaction or may deform the crops.

SUMMARY OF THE DISCLOSURE

This disclosure provides embodiments of an articulated boom system for work vehicles, such as agricultural sprayers, with reduced weight and without compromising the boom's reach.

In one aspect the disclosure provides a boom system for a work vehicle include a first boom member, a section boom member and a union. The first boom member has a plurality of first boom segments aligned lengthwise to extend along a first boom dimension, and the second boom member has a plurality of second boom segments aligned lengthwise to extend in the first boom dimension and spaced from the first boom member in a second boom dimension. The union spans the second boom dimension to couple the first boom member to the second boom member. The union has a first coupling segment joining consecutive first boom segments together and a second coupling segment joining consecutive second boom segments together.

Another aspect of the disclosure provides a boom system for a work vehicle having a first boom section and a second boom section. The first and second boom sections each having spaced apart upper and lower boom members each with a plurality of segments aligned lengthwise to extend along a first boom dimension. Each of the first and second boom sections have a plurality of unions spaced apart in the first boom dimension and spanning a second boom dimension to couple the upper and lower boom members of the associated first and second boom section. In each of the first and second boom sections, at least one of the plurality of unions has a strut at opposite ends of which are upper and lower coupling segments. The upper coupling segments are disposed in line with consecutive segments of the upper boom member, and the lower coupling segments are disposed in line with consecutive segments of the lower boom member. Also, in each of the first and second boom sections, at least one of the plurality of unions has a hinge part defining a strut at opposite ends of which are upper and lower one-sided coupling segments. The upper one-sided coupling segment couples to one of the segments of the upper boom member, and the lower one-sided coupling segment couples to one of the lower boom segments. The hinge parts of the first and second boom sections are coupled along a hinge axis so as to pivotally couple the first and second boom sections.

The details of one or more embodiments are set forth in the accompanying drawings and the description below.

BRIEF DESCRIPTION OF THE DRAWINGS

FIG. 2 is a front perspective view of one side of the spray boom of FIG. 1A having three boom wing sections;

FIG. 3A is an exploded view of area A-A of FIG. 2, including an example union for connecting four boom segments of one of the boom segments of FIG. 2;

FIG. 3B is a view of the area A-A of FIG. 2, with the union and boom segments assembled;

FIG. 3C is an end view of the union shown in FIG. 3A;

FIG. 4 is a cross-sectional view of area A-A of FIG. 2;

FIGS. 5A through 5H are perspective views of alternative arrangements for the union of FIGS. 3A and 3B;

FIGS. 6A through 6H are schematic end views of example coupling segments for the union of FIGS. 3A and 3B;

Figure 1A:
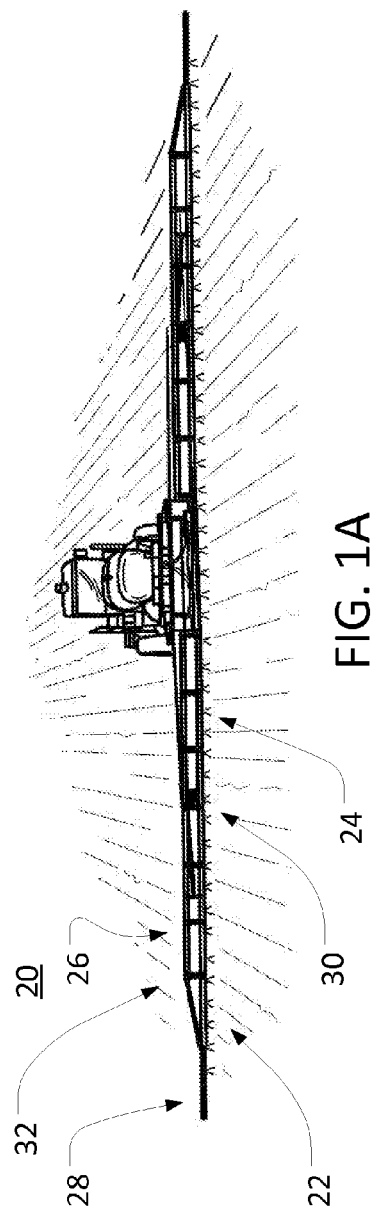
FIG. 1A is a rear perspective view of an example sprayer vehicle with a spray boom during a spraying operation.

The Detailed Description refers to the aforementioned example figures.

DETAILED DESCRIPTION

The following describes one or more example embodiments of the disclosed boom system, as shown in the accompanying figures of the drawings described briefly above.

For long articulated spray booms such as those used in agriculture, there are often three or four wings, sometimes called an inner wing (e.g. 24 in FIG. 1A), outer wing (middle wing, e.g. 30) and breakaway wing (outermost wing, e.g. 22). Spray vehicles having such spray booms apply nutrients, herbicides, paints, chemicals and other liquids such those used in agriculture or industrial applications; sprayers tend to be very heavy because they often have large physical structures (e.g. booms) to which pipes are attached, and the pipes are filled with the heavy liquids. To reduce the weight, mostly non-metallic embodiments of the boom are disclosed. The disclosed examples of the new boom system have a reduced weight relative to conventional systems, and include boom segments formed from multiple sections. For instance, the boom wings (e.g. inner and outer wings) are now themselves segmented and each segment has multiple pieces or sections. In FIG. 2, inner wing 24 is formed from horizontal segments 42, 46 and 94 on the lower portion, and horizontal segments 40, 44 and 92 on the upper portion. The vertical union members (e.g. A-A) for inner wing 24 forms about a 90 degree angle from both the lower portion and from the upper portion. The example boom segments with multiple pieces or sections are formed from relatively lightweight material, such as polymers or composites such as fiber, glass, Kevlar, flax or carbon fiber composites. The boom segments are joined together (joint sections, each of which have multiple sections), also using light weight materials so that over 80-95 percent of the entire boom system is non-metallic. Despite the light weight, due to the architecture, construction of the joint sections, the diamond orientation of the boom cross section, the suspension, etc., the disclosed example boom systems still manage to stay rigid and do not vibrate in the wind or when going over rough terrain or traveling up to 25 mph.

The modularity of the boom segments, sections and joint sections reduces manufacturing costs and aids flexibility during assembly and enables many possible variations in the design of the booms, somewhat like LEGO components. While the discussion below focuses on spray booms used in agriculture, the concepts can be applied to air booms used in dry chemical spreaders, booms used in construction machinery (e.g., cranes).

In some embodiments, multiple instances of such sections can be formed as identical (e.g., interchangeable) sections that can be joined together with suitable unions. In this way, for example, the manufacturing and assembly of the boom segments can be simplified considerably. Unions for the disclosed boom system can also allow for relatively simple joinder of consecutive sections of various boom segments, as well as allowing different boom segments to be folded relative to each other.

Figure 1B:
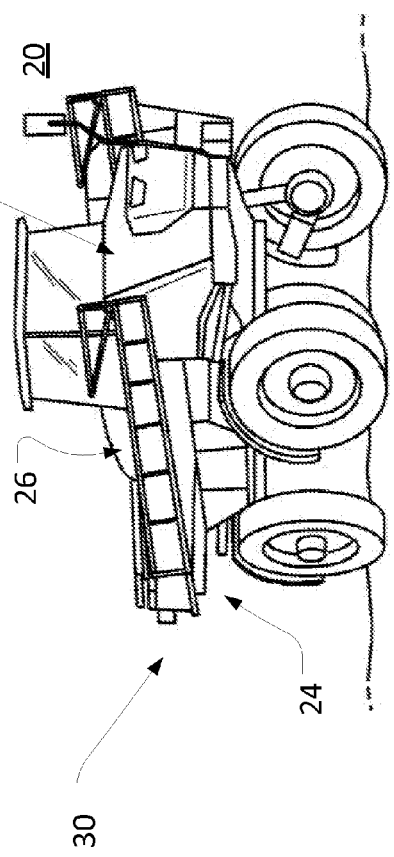
FIG. 1B is a side perspective view of the sprayer vehicle of FIG. 1A with the spray boom folded for non-spraying transport.

FIGS. 1A and 1B illustrate an example sprayer vehicle 20 for agricultural spraying operations. Various embodiments of a segmented boom system, as discussed herein, may be used with (and, accordingly, presented in the context of) the sprayer vehicle 20. It will be understood, however, that the disclosed segmented boom system (and components thereof) can be used with sprayer vehicles having different configurations than the sprayer vehicle 20, as well as with other types of work vehicles.

FIG. 1A illustrates the sprayer vehicle 20 during a spraying operation in an agricultural field. Generally, the sprayer vehicle 20 supports a boom 22, which can extend a substantial distance to either side of the body of the sprayer vehicle 20 in order to distribute material onto the field. As depicted, the boom 22 of the sprayer vehicle 20 is generally symmetric with respect to the body of the sprayer vehicle 20. Accordingly, discussion herein of the boom 22 may be presented with respect to only one side of the boom 22. It will be understood that such discussion may also apply to the other side of the boom 22, portions of a boom mounted directly behind (or elsewhere on) a vehicle, or booms (not shown) that may not be symmetrical with respect to a vehicle.

In some embodiments, an articulated boom includes multiple boomwings. In some embodiments, certain of these wings may be foldable relative to each other, such that the extension of the boom to either side of the relevant vehicle can be reduced. For example, as illustrated in particular in FIG. 2, the boom 22 can include at least three boom sections on either side of the sprayer vehicle 20, including a near-vehicle boom wing 24 ("inner wing"), an intermediate boom wing 26 ("outer wing"), and a tip boom wing 28 ("break-away wing"). A joint 30 between the boom sections 24 and 26, and a joint 32 between the boom sections 26 and 28 can be configured to allow the various boom sections 24, 26, and 28 to pivot relative to each other, such that the boom 22 can be generally folded to a reduced extension distance from the body of the sprayer vehicle 20. For example, as illustrated in FIG. 1B, the boom 22 can be folded at the joint 30 until the boom sections 26 and 28 extend roughly in parallel with the front-to-rear axis of the sprayer vehicle 20, as may be useful for non-spraying vehicle transport (e.g., travel over public roads).

In some embodiments, boom sections of a boom can be further subdivided into boom segments. As illustrated in FIGS. 2, 3A and 3B, for example, the boom wing 24 includes multiple boom segments, including boom segments 40, 42, 44 and 46 disposed on either side of the joint 30. Generally, the boom segments 40, 42, 44, and 46 extend in parallel with each other (at least when the boom 22 is fully unfolded) and along the same general dimension as the boom 22 (i.e., generally left to right, as depicted in FIG. 2. In order to provide structural stability to the boom 22, the boom segments 40 and 44 can be generally axially aligned with each other (again, at least when the boom 22 is fully unfolded), as can the boom segments 42 and 46. The boom segments 40 and 44 are generally removed from the boom segments 42 and 46 along a different dimension (e.g., vertically, as illustrated). As depicted, the boom segments 40 and 44 are disposed in vertical alignment with the boom segments 42 and 46. In other embodiments, either of the boom segments 40 and 44 can instead be offset forward or rearward from either of the boom segments 42 and 46. When assembled in succession, the boom segments 40 and 44 (possibly with other additional boom segments) form part of an elongated upper boom member, and the boom segments 42 and 46 (possibly with other additional boom segments) form part of an elongated lower boom member. The elongated lower boom member is tubular as shown in FIG. 2. An orientation of the tube is such that a cross section of the tubular lower boom member is diamond shaped with the lowermost vertex of the diamond closest to the ground plane (see, e.g., FIG. 3C where the ground plane is the squiggly line at the bottom of the figure). In this context, "lower" refers to the extended boom member that is closest to the ground or plane of the target being sprayed.

In some embodiments, the elongated lower boom member is an extended articulated tubular boom that is over 30 meters long. The articulated tubular boom has three or four wings such as shown in FIG. 1A. The elongated upper boom member is made of cable except in the joint region, between the boom wings, where the wings fold. The joint region has pieces that are mostly perpendicular to the horizontal elongated upper and lower boom members. The joint region span between the elongated upper and elongated lower boom members. In other words, the elongated lower boom member is suspended or tethered to the spray vehicle or center rack of the vehicle by cables such as fiber cable (e.g. dyneema) or steel cable. The joint region may also be tethered to the spray vehicle or to other joint regions or to the elongated lower boom member by cables. In such an embodiment, the orientation of the tubular boom is such that a cross section of the tubular lower boom member is diamond shaped with the lowermost vertex of the diamond closest to the ground plane (see, e.g., FIG. 3C where the ground plane is the squiggly line at the bottom of the figure).

The boom segments 40, 42, 44, and 46 can be formed from one or more of a variety of materials, including polymers, graphite, non-ferrous metals such as aluminum or aluminum alloys, and composite fiber materials such as carbon fiber, flax fiber, and fiberglass. As illustrated in FIG. 3A, the boom segments 40, 42, 44, and 46 can be formed with hollow ends. In some embodiment, the entire lengths of the various boom segments 40, 42, 44, and 46 can be hollow. In some embodiments, only part of the lengths (e.g., only the ends) of the boom segments 40, 42, 44, and 46 are hollow, or the boom segments 40, 42, 44, and 46 are hollow, but with some amount of internal structure (e.g., internal ribs, struts, filling, and so on).

In some embodiments, the various boom segments 40, 42, 44, and 46 (and others) can be formed as generally identical (and, thereby, interchangeable) components. For example, each of the boom segments 40, 42, 44, and 46 can be formed as an extended hollow body of the same length and cross-section, such that the boom segments 40, 42, 44, and 46 may be indistinguishable from each other before installation on the boom 22. This may be useful, for example, in order to simplify manufacturing and assembly of the boom 22. For instance, tubular hollow boom segments can be manufactured in an automated pultrusion process for fiber materials. Alternatively, a reinforced 3-D printing may be more suitable for more granular materials. Reinforcement includes a composite fiber or carbon fiber reinforced 3-D printing.

In order to connect the various boom segments 40, 42, 44, and 46 to each other, a union 50 can be provided. In some embodiments, the union 50 can be formed from one or more of a variety of materials, including polymers, graphite, non-ferrous metals such as aluminum or aluminum alloys, and composite fiber materials such as carbon fiber, flax fiber, and fiberglass. In some embodiments, the union 50 can be formed from the same material as the various boom segments 40, 42, 44, and 46. In some embodiments, the union 50 can be formed from different materials than the various boom segments 40, 42, 44, and 46.

Generally, the union 50 can include two coupling segments such that the union 50 can connect the boom segments 40 and 44 to each other, can connect the boom segments 42 and 46 to each other, and can connect the boom segments 40 and 44 to the boom segments 42 and 46, respectively. In this way, for example, the union 50 can allow modular sections of the boom 22 (e.g., the various boom segments 40, 42, 44, and 46) to be joined together along the length dimension and height dimension of the boom 22.

In some embodiments, the coupling segments can extend generally in parallel with (i.e., generally along the same dimension as) the boom segments 40, 42, 44, and 46, with a strut extending between the two coupling segments (e.g., generally in a different dimension than the coupling segments). In the embodiment illustrated in FIGS. 3A and 3B, for example, the union 50 includes a strut 52 extending perpendicularly between upper and lower coupling segments 54 and 56. As illustrated in FIGS. 3A through 4, the strut 52 is configured with a generally I-shaped profile, with a relatively narrow (left-to-right, as illustrated in FIG. 4), but generally deep (into the page, as illustrated in FIG. 4) central support 58 extending between relatively wide, but generally shallow, end supports 60.

In other embodiments, other profiles are used for the strut 52 (or other struts). FIGS. 5A through 5H illustrate various examples, with components corresponding to the boom segments 40, 42, 44, and 46, the union 50, and components thereof indicated by an appended letter corresponding to the figure label (e.g., alternate union 50a for FIG. 5A, alternate strut 52c for FIG. 5C, and so on). Accordingly, it can be seen that a strut for a union can be configured as: a generally I-shaped strut 52a (rotated 90 degrees with respect to the orientation of the strut 52); a generally I-shaped strut 52b extending at a laterally non-perpendicular angle to boom segments 40b, 42b, 44b, and 46b and the coupling segments 54b and 56b; a generally I-shaped strut 52c extending at a depth-wise non-perpendicular angle to boom segments 40b, 42b, 44b, and 46c and the coupling segments 54c and 56c; a curved strut 52d (e.g., generally I-shaped, as illustrated), a generally X-shaped strut 52e with "legs" of the "X" oriented in parallel with, and perpendicularly to, the length dimension of boom segments 40e, 42e, 44e, and 46e; a generally T-shaped strut 52f, a generally X-shaped strut 52g with "legs" of the "X" oriented at non-perpendicular angles to the length dimension of boom segments 40g, 42g, 44g, and 46g, and a generally X-shaped strut 52h with curved "legs." In other embodiments, various struts shown in FIGS. 3A through 5H can be disposed at other angles or rotational orientations with respect to the relevant boom segments or coupling segments. In some embodiments, struts of different kinds (e.g., as depicted in FIGS. 3A through 5H) can be combined into compound struts (e.g., struts with a combination of X-shaped and T-shaped profiles).

Coupling segments and associated ends (or other portions) of boom segments can be configured with various types of geometries. As depicted, for example, the ends of the boom segments 40, 42, 44, and 46 are configured as diamond shaped (when viewed in cross section), hollow tubes with substantially squared corners. Further, opposite ends of the coupling segments 54 and 56 are configured as similar diamond shaped members (which may also be hollow in some embodiments). Because the coupling segments 54 and 56 are similar to, but somewhat smaller than the ends of the boom segments 40, 42, 44, and 46, the ends of the coupling segments 54 and 56 can be inserted into the ends of the boom segments 40, 42, 44, and 46 in order to secure the union 50 to the boom segments 40, 42, 44, and 46 and thereby also connect the various boom segments 40, 42, 44, and 46 together. In this regard, the coupling segments 54 and 56 can be viewed as being aligned coaxially with, and inserted coaxially into, the relevant boom segments 40, 42, 44, and 46. Once inserted, the ends of the coupling segments 54 and 56 can be secured in place in various ways, including with rivets 62, adhesive 64, or a threaded fastener 66, as illustrated in FIG. 4.

In certain embodiment, two vertices (upper and lower in FIG. 3C) of each end of the boom segments 40, 42, 44 and 46 fall along a centerline axis 48, which may correspond to a dimension transverse to the direction of travel of the implement, such as vertical. In such an example, squared-corner diamond geometry illustrated for the boom segments 40, 42, 44, and 46 and the coupling segments 54 and 56 can provide relatively strong support and relatively high stiffness to the assembled boom 22 for a given amount of material or coupling segment perimeter. In other embodiments, however, other configurations are possible. As illustrated in FIGS. 6A through 6H, for example, the cross-section of an end of a coupling segment (e.g., one of the coupling segments 54 and 56) can be configured as a rectangle with same length sides (square) 68, a relatively wide rectangle 70, a relatively tall rectangle 72, a non-squared diamond 74, a circle 76, a relatively wide generally elliptical shape 78, a relatively tall generally elliptical shape 80, or a generally oval shape 82 (in each case, as depicted, or rotated to varying degrees). In some embodiments, the cross-section of a corresponding end of a boom segment (e.g., one of the boom segments 40, 42, 44 or 46) can then be configured with a similar (or different) geometry.

As illustrated in FIGS. 3A through 4, the coupling segments 54 and 56 can be inserted into the ends of the various boom segments 40, 42, 44, and 46. In some embodiments, an opposite configuration may be possible, in which the ends of the boom segments 40, 42, 44, and 46 can be inserted into the coupling segments 54 and 56. In some embodiments, an intermediary connector (not shown) can be used between the boom segments 40, 42, 44, and 46 and the relevant coupling segment 54 or 56. For example, in some embodiments, the boom segments 40, 42, 44, and 46 and the coupling segments 54 and 56 are configured with similar peripheral dimensions. Collars (not shown) can then be disposed between the relevant pairs of the boom segments 40, 42, 44, and 46 and the coupling segments 54 and 56, with opposing male connectors of each collar extending into (or opposing female connectors receiving) the relevant boom segment 40, 42, 44, or 46 and the corresponding coupling segment 54 or 56. In this regard, in some embodiments, such a collar can be viewed as forming part of a coupling segment of a union, even if the collar and the union are formed as separate pieces.

As illustrated in FIGS. 3A and 4, the coupling segments 54 and 56 can be formed as generally hollow bodies. In some embodiment, the entire lengths of the coupling segments 54 and 56 can be hollow. In some embodiments, only part of the lengths (e.g., only the ends) of the coupling segments 54 and 56 are hollow, or the coupling segments 54 and 56 are generally hollow, but with some amount of internal structure (e.g., internal ribs, struts, filling, and so on).

Figure 7:
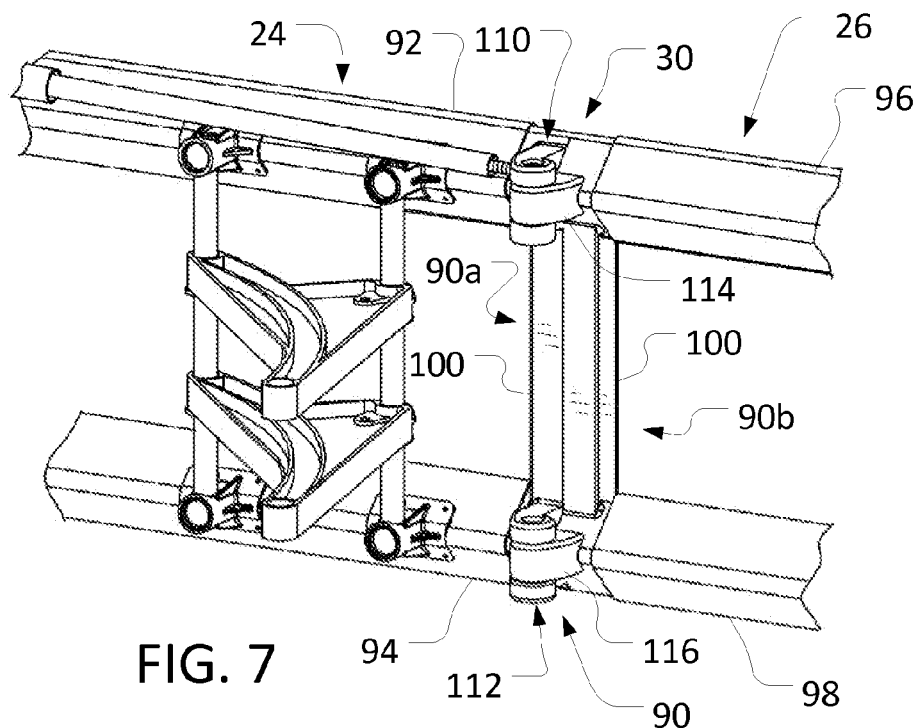
FIG. 7 is a front perspective view of area B-B of FIG. 2, including a hinged union for connecting a further four boom segments included on two of the boom segments of FIG. 2.
Figure 8:
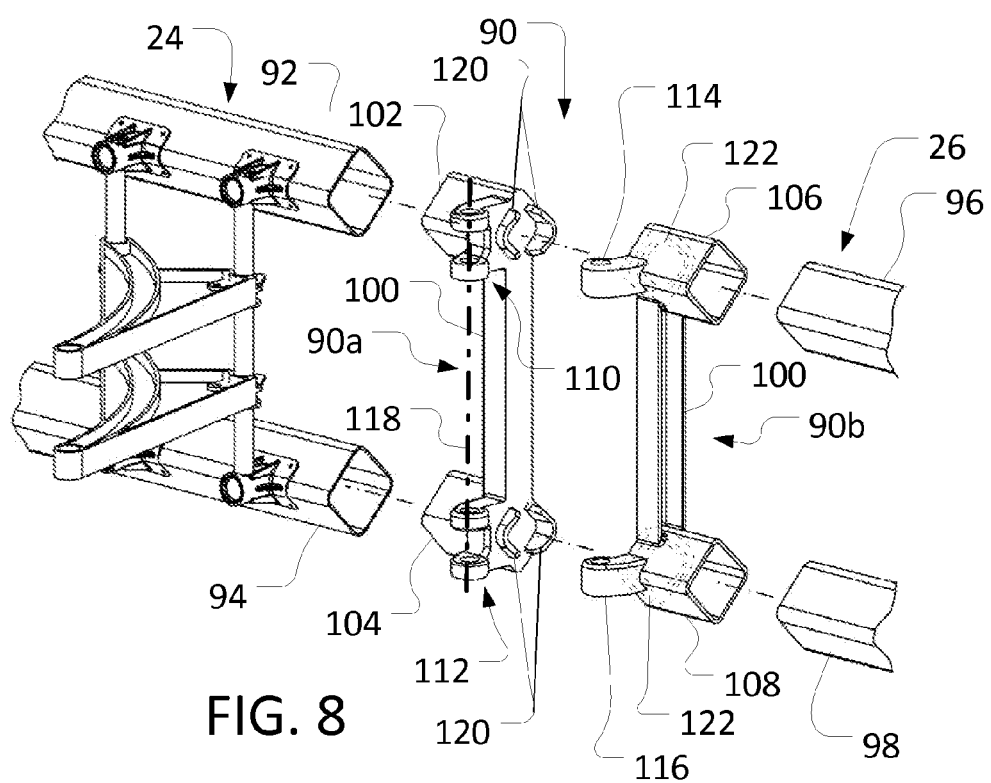
FIG. 8 is an exploded front perspective view of the union and boom segments of FIG. 7.

In some embodiments, a union can be configured to pivotally couple consecutive boom segments, such that the boom segments are pivoted relative to each other. This may be useful in folding booms, and other configurations. FIGS. 7 and 8 illustrate an example hinged union 90 for the joint 30 between the boom segments 24 and 26 of the boom 22. As depicted, the boom wing 24 (e.g., as discussed above) and the boom wing 26 can be configured with multiple boom segments, including boom segments 92, 94, 96 and 98 disposed adjacent to the joint 30.

Generally, the boom segments 92, 94, 96, and 98 extend in parallel with each other (at least when the boom 22 is fully unfolded) and along the same general dimension as the boom 22 (i.e., generally left to right, as depicted in FIGS. 7 and 8). In order to provide structural stability to the boom 22, the boom segments 92 and 96 can be generally axially aligned with each other (again, at least when the boom 22 is fully unfolded), as can the boom segments 94 and 98. Further, the boom segments 92 and 96 can be generally removed from the boom segments 94 and 98 along a different dimension (e.g., vertically, as illustrated). As depicted, the boom segments 92 and 96 are disposed in vertical alignment with the boom segments 94 and 98. In other embodiments, either of the boom segments 92 and 96 can instead be offset forward or rearward from either of the boom segments 94 and 98.

The boom segments 92, 94, 96, and 98 can be formed from one or more of a variety of materials, including polymers, graphite, non-ferrous metals such as aluminum or aluminum alloys, and composite fiber materials such as carbon fiber, flax fiber, and fiberglass. As illustrated in FIG. 8, the boom segments 92, 94, 96, and 98 can be formed with hollow ends. In some embodiment, the entire lengths of the various boom segments 92, 94, 96, and 98 can be hollow. In some embodiments, only part of the lengths (e.g., only the ends) of the boom segments 92, 94, 96, and 98 may be hollow, or the boom segments 92, 94, 96, and 98 may be generally hollow, but with some amount of internal structure (e.g., internal ribs, struts, filling, and so on).

In some embodiments, the various boom segments 92, 94, 96, and 98 (and others) can be formed as generally identical (and, thereby, interchangeable) components. For example, each of the boom segments 92, 94, 96, and 98 can be formed as an extended hollow body of the same length and cross-section, such that the boom segments 92, 94, 96, and 98 may be generally indistinguishable from each other before installation on the boom 22. In some embodiments, the boom segments 92, 94, 96 and 98 can also be formed to be generally identical to the boom segments 40, 42, 44, and 46 (see, e.g., FIGS. 3A through 4). This may be useful, for example, in order to simplify manufacturing and assembly of the boom 22. Like boom segments 40, 42, 44 and 46, when assembled in succession, the boom segments 92 and 96 (possibly with other additional boom segments) may form part of the elongated upper boom member, and the boom segments 94 and 98 (possibly with other additional boom segments) may form part of the elongated lower boom member. The upper and lower boom members may be thought of as the segmented structures of individual sections, which extend laterally side to side relative to the direction of travel of the implement when the boom is in an operational position, or the overall upper and lower laterally extending structures of combined sections, for example, with hinged connections between the sections.

In the illustrated embodiment, the union 90 can be used to pivotally connect the various boom segments 92, 94, 96, and 98 to each other. In some embodiments, the union 90 can be formed from one or more of a variety of materials, including polymers, graphite, non-ferrous metals such as aluminum or aluminum alloys, and composite fiber materials such as carbon fiber, flax fiber, and fiberglass. In some embodiments, the union 90 can be formed from the same material as the various boom segments 92, 94, 96, and 98. In some embodiments, the union 90 can be formed from different materials than the various boom segments 92, 94, 96, and 98.

Figure 9:
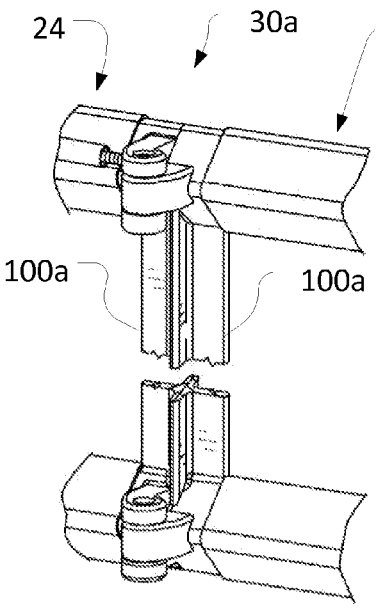
FIG. 9 is a partial front perspective of another example hinged union.

In order to provide pivotal movement between the various boom segments 92, 94, 96 and 98 (and the boom segments 24 and 26, generally), the union 90 is formed with two parts 90a and 90b configured to mate to each other as well as to connect to relevant parts of the various boom segments 92, 94, 96, and 98. Each of the union parts 90a and 90b include a generally C-shaped strut 100, which together form a generally I-shaped compound member when the union 90 is fully closed (e.g., as illustrated in FIG. 7). In other embodiments, other configurations are possible, including generally T-shaped union parts that form a generally X-shaped compound member when the union is fully closed or various combinations or sub-divisions of the various strut geometries illustrated in FIGS. 5A through 5H. In some embodiments, struts for a generally X-shaped compound member can be disposed at a rotated orientation relative to the orientation of the struts 100. As illustrated in FIG. 9, for example, struts 100a of an alternate joint 30a can be generally T-shaped, but rotated 90 degrees relative to the struts 100. In some embodiments, the struts 100 (or equivalent members) include angled or arcuate portions (e.g., similar to that depicted for the strut 52d in FIG. 5D), relative to the various boom segments 92, 94, 96, and 98.

At opposite ends of the struts 100, each of the union parts 90a and 90b includes one of various coupling segments 102, 104, 106, and 108, such that the union 90 can connect the boom segments 92 and 96 to each other, can connect the boom segments 94 and 98 to each other, and can connect the boom segments 92 and 96 to the boom segments 94 and 98, respectively. In this way, for example, the union 90 can allow modular sections of the boom 22 to be joined together along the length dimension and height dimension of the boom 22.

In some embodiments, the coupling segments 102, 104, 106, and 108 can extend generally in parallel with (i.e., generally along the same dimension as) the boom segments 92, 94, 96, and 98, with the struts 100 extending between respective pairs of the coupling segments 102, 104, 106, and 108 (e.g., generally in a different dimension than the coupling segments).

Coupling segments and associated ends (or other portions) of boom segments can be configured with various types of geometries. As depicted, for example, the ends of the boom segments 92, 94, 96, and 98 are configured as diamond shaped, hollow tubes with substantially squared corners. Further, outside ends of the coupling segments 102, 104, 106, and 108 are configured as similar diamond shaped members (which may also be hollow in some embodiments). Because the coupling segments 102, 104, 106, and 108 are similar to, but somewhat smaller than the ends of the boom segments 92, 94, 96, and 98, the ends of the coupling segments 102, 104, 106, and 108 can be inserted into the ends of the boom segments 92, 94, 96, and 98 in order to secure the union 90 to the boom segments 92, 94, 96, and 98 and thereby also connect the various boom segments 92, 94, 96, and 98 together. In this regard, the coupling segments 102, 104, 106, and 108 can be viewed as being aligned coaxially with, and inserted coaxially into, the relevant boom segments 92, 94, 96, and 98. Once inserted, the ends of the coupling segments 102, 104, 106, and 108 can be secured in place in various ways, including with rivets, adhesives, or threaded fasteners (not shown for the union 90).

The example diamond geometry illustrated for the boom segments 92, 94, 96, and 98 and the coupling segments 102, 104, 106, and 108 can provide relatively strong support and relatively high stiffness to the assembled boom 22. In other embodiments, however, other configurations are possible. For example, cross-sections of the coupling segments 102, 104, 106, and 108 can be configured as a square, a rectangle, a non-squared diamond, a circle, a generally elliptical shape, or a generally oval shape (e.g., as depicted in FIGS. 5A through 5H). In some embodiments, the cross-section of a corresponding end of a boom segment (e.g., one of the boom segments 92, 94, 96, or 98) can then be configured with a similar (or different) geometry.

As depicted in FIGS. 7 and 8, the coupling segments 102, 104, 106, and 108 can be inserted into the ends of the various boom segments 92, 94, 96, and 98. In some embodiments, an opposite configuration is possible, in which the ends of the boom segments 92, 94, 96, and 98 can be inserted into the coupling segments 102, 104, 106, and 108. In some embodiments, an intermediary connector (not shown) can be used between the boom segments 92, 94, 96, and 98 and the relevant coupling segment 102, 104, 106 or 108. For example, in some embodiments, the boom segments 92, 94, 96, and 98 and the coupling segments 102, 104, 106, and 108 are configured with similar peripheral dimensions. Collars (not shown) can then be disposed between the relevant pairs of the boom segments 92, 94, 96, and 98 and the coupling segments 102, 104, 106, and 108, with opposing male connectors of each collar extending into (or opposing female connectors receiving) the relevant boom segment 92, 94, 96, or 98 and the corresponding coupling segment 102, 104, 106, or 108. In this regard, in some embodiments, such a collar can be viewed as forming part of a coupling segment of a union, even if the collar and the union are formed as separate pieces.

As illustrated in FIG. 8, the coupling segments 102, 104, 106, and 108 can be formed as generally hollow bodies. In some embodiment, the entire lengths of the coupling segments 102, 104, 106, and 108 can be hollow. In some embodiments, only part of the lengths (e.g., only the ends) of the coupling segments 102, 104, 106, and 108 are hollow, or the coupling segments 102, 104, 106, and 108 are generally hollow, but with some amount of internal structure (e.g., internal ribs, struts, filling, and so on).

In order to allow the boom segments 24 and 26 to pivot relative to each other the union parts 90a and 90b can include complementary hinge components. As illustrated in FIGS. 7 and 8, for example, the union part 90a can include hinge ears 110 and 112, which can be connected by a hinge pin extending along a hinge axis 118 (see FIG. 7) to complementary hinge tabs 114 and 116 on the union part 90b. In other embodiments, other hinged arrangements can alternatively (or additionally) be used.

In some embodiments, the union parts 90a and 90b can be mechanically fastened to one another at locations other than along the hinge axis 118. For example, detents, pins, catches, press- or snap-fit features, or other arrangements can be disposed to help hold the union parts 90a and 90b together when the union 90 is in the fully closed orientation. As illustrated in FIG. 8, generally C-shaped tabs 120 on the union part 90a can be configured for press-fit (or other) engagement with complimentary cavities 122 (depicted in dotted relief) of the union part 90b. When the union 90 is in the fully closed orientation (e.g., as depicted in FIG. 7) the tabs 120 can engage the cavities 122, in order to help resist unintended opening of the union 90 and corresponding folding of the boom 22.

Figure 10:
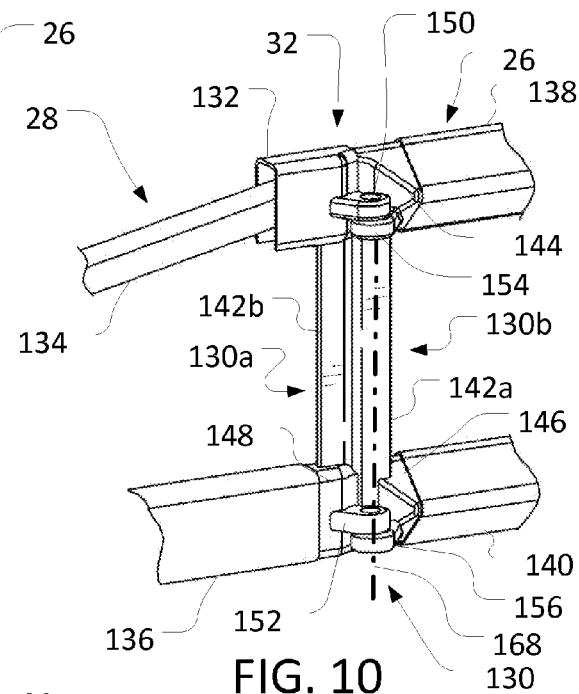
FIG. 10 is a rear perspective view of area C-C of FIG. 2, including still another example union for connecting two of the boom segments of FIG. 2.
Figure 11:
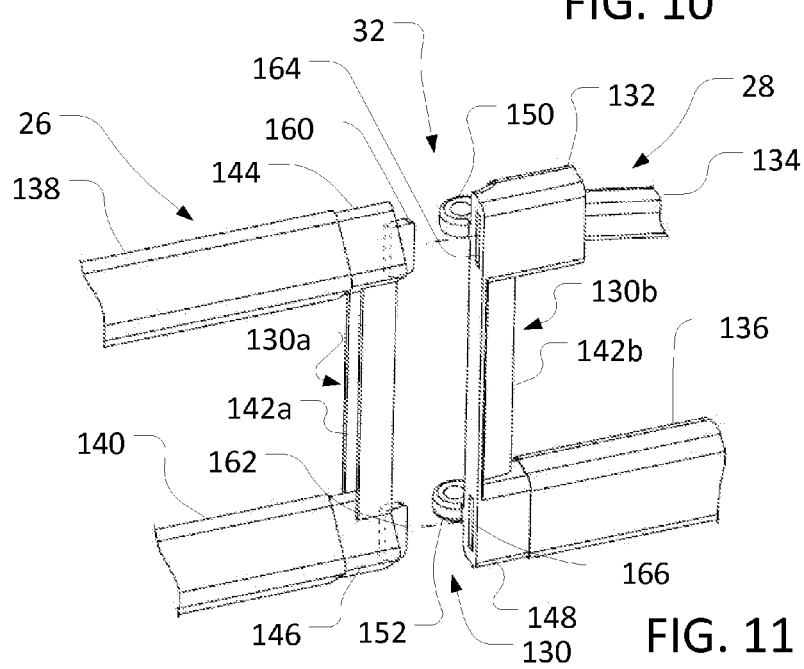
FIG. 11 is an exploded front perspective view of the union and boom segments of FIG. 10.
Figure 12:
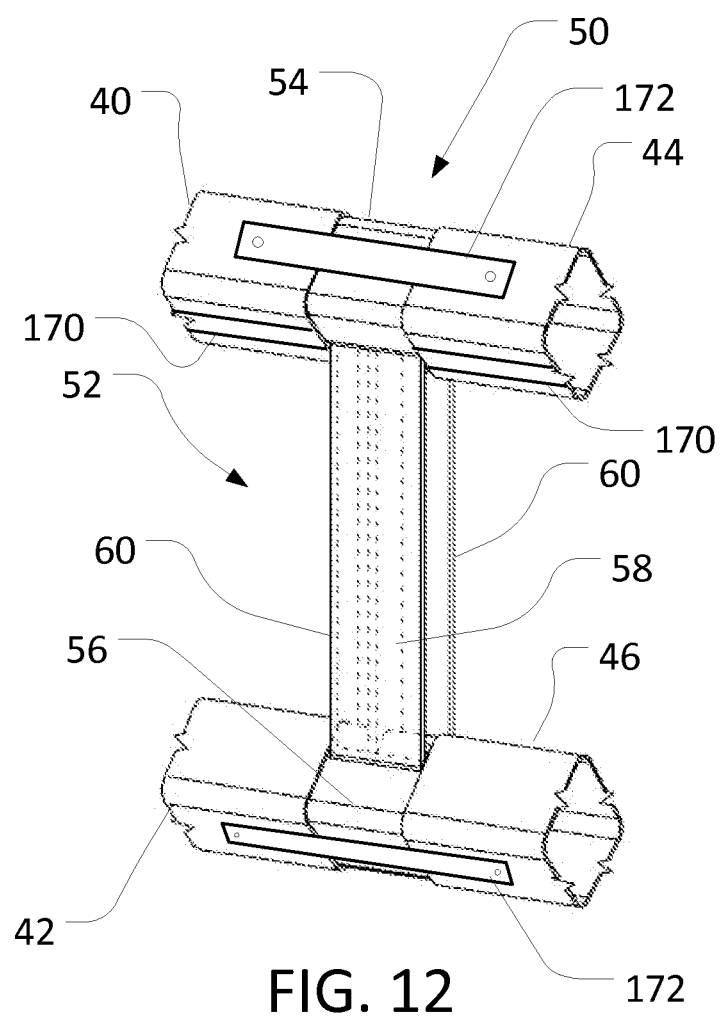
FIG. 12 is a front perspective view similar to FIG. 3B, including example electrically conductive straps and strips.

Another example of a hinged union is illustrated in FIGS. 10 and 11 in the form of a union 130 for the joint 32 between the boom segments 26 and 28 of the boom 22. As depicted, the boom wing 26 (e.g., as discussed above) and the boom wing 28 can be configured with multiple boom segments, including boom segments 134, 136, 138, and 140 disposed adjacent to the joint 32.

Generally, the boom segments 136, 138, and 140 extend in parallel with each other (at least when the boom 22 is fully unfolded) and along the same general dimension as the boom 22 (i.e., generally left to right, as depicted in FIGS. 10 and 11). The section 134, in contrast, is configured as an angled strut extending from the top of the boom wing 28 towards the bottom of the boom wing 28. In order to provide structural stability to the boom 22, the boom segments 136 and 140 can be generally axially aligned with each other (again, at least when the boom 22 is fully unfolded), as can the boom segment 138 and the upper end of the boom segment 134. Further, the boom segments 134 and 138 and 96 can be generally removed from the boom segments 136 and 140 along a different dimension (e.g., vertically, as illustrated). As depicted, the boom segments 134 and 138 are disposed in vertical alignment with the boom segments 136 and 140. In other embodiments, either of the boom segments 134 and 138 can instead be offset forward or rearward from either of the boom segments 136 and 140.

The boom segments 134, 136, 138, and 140 can be formed from one or more of a variety of materials, including polymers, graphite, non-ferrous metals such as aluminum or aluminum alloys, and composite fiber materials such as carbon fiber, flax fiber, and fiberglass. In some embodiments, the boom segments 134, 136, 138, and 140 can be formed with hollow ends. In some embodiment, the entire lengths of the various boom segments 134, 136, 138, and 140 can be hollow. In some embodiments, only part of the lengths (e.g., only the ends) of the boom segments 134, 136, 138, and 140 may be hollow, or the boom segments 134, 136, 138, and 140 may be generally hollow, but with some amount of internal structure (e.g., internal ribs, struts, filling, and so on).

In some embodiments, certain of the various boom segments 134, 136, 138, and 140 (and others) can be formed as generally identical (and, thereby, interchangeable) components. For example, each of the boom segments 138 and 140 can be formed as an extended hollow body of the same length and cross-section, such that the boom segments 138 and 140 may be generally indistinguishable from each other before installation on the boom 22. In some embodiments, certain of the boom segments 134, 136, 138, and 140 can also be formed to be generally identical to the boom segments 40, 42, 44, and 46 (see, e.g., FIGS. 3A through 4) or the boom segments 92, 94, 96, and 98. This may be useful, for example, in order to simplify manufacturing and assembly of the boom 22. Like boom segments 40, 42, 44 and 46 and 92, 94, 96 and 98, when assembled in succession, the boom segments 134 and 138 (possibly with other additional boom segments) form part of the elongated upper boom member, and the boom segments 136 and 140 (possibly with other additional boom segments) form part of the elongated lower boom member.

In the illustrated embodiment, the union 130 can be used to pivotally connect the various boom segments 134, 136, 138, and 140 to each other. In some embodiments, the union 130 can be formed from one or more of a variety of materials, including polymers, graphite, non-ferrous metals such as aluminum or aluminum alloys, and composite fiber materials such as carbon fiber, flax fiber, and fiberglass. In some embodiments, the union 130 can be formed from the same material as the various boom segments 134, 136, 138, and 140. In some embodiments, the union 130 can be formed from different materials than the various boom segments 134, 136, 138, and 140.

In order to provide pivotal movement between the various boom segments 92, 94, 96 and 98 (and the boom segments 24 and 26, generally), the union 130 is formed with two parts 130a and 130b configured to mate to each other as well as to connect to relevant parts of the various boom segments 134, 136, 138, and 140. In the illustrated embodiment, the union part 130a includes a generally L-shaped strut 142a and the union part 130b includes a generally C-shaped strut 142b, which together form a generally Y-shaped compound member when the union 130 is fully closed (e.g., as illustrated in FIG. 7). In other embodiments, other configurations are possible, including generally T-shaped union parts that form a generally X-shaped compound member when the union is fully closed or various combinations or sub-divisions of the various strut geometries illustrated in FIGS. 5A through 5H.

At opposite ends of the struts 142a and 142b, each of the union parts 130a and 130b includes one of various coupling segments 132, 144, 146, and 148, such that the union 130 can connect the boom segments 134 and 138 to each other, can connect the boom segments 136 and 140 to each other, and can connect the boom segments 134 and 138 to the boom segments 136 and 140, respectively. In this way, for example, the union 130 can allow modular sections of the boom 22 to be joined together along the length dimension and height dimension of the boom 22.

In some embodiments, the coupling segments 144, 146, and 148 can extend generally in parallel with (i.e., generally along the same dimension as) the boom segments 136, 138, and 140, with the struts 142 extending between respective pairs of the coupling segments 132, 144, 146, and 148 (e.g., generally in a different dimension than the coupling segments).

Coupling segments and associated ends (or other portions) of boom segments can be configured with various types of geometries. As depicted, for example, the ends of the boom segments 138 and 140 are configured as diamond shaped, hollow tubes with substantially squared corners. Further, outside ends of the coupling segments 144 and 146 are configured as similar diamond shaped members (which may also be hollow in some embodiments). Similarly, the outside end of the coupling segment 148 is configured as a generally rectangular member, with a slightly smaller cross-section than the rectangular profile of the boom segment 136. Because the coupling segments 144, 146, and 148 are similar to, but somewhat smaller than the ends of the boom segments 136, 138, and 140, the ends of the coupling segments 144, 146, and 148 can be inserted into the ends of the boom segments 136, 138, and 140 in order to secure the union 130 to the boom segments 136, 138, and 140 and thereby also connect the various boom segments 134 136, 138, and 140 together. In this regard, the coupling segments 144, 146, and 148 can be viewed as being aligned coaxially with, and inserted coaxially into, the relevant boom segments 136, 138, and 140. Once inserted, the ends of the coupling segments 144, 146, and 148 can be secured in place in various ways, including with rivets, adhesives, or threaded fasteners (not shown for the union 130).

The example diamond geometry illustrated for the boom segments 136, 138, and 140 and the coupling segments 144, 146, and 148 can provide relatively strong support and relatively high stiffness to the assembled boom 22. In other embodiments, however, other configurations are possible. As illustrated in FIGS. 10 and 11, for example, the coupling segment 132 has a generally U-shaped profile (e.g., as illustrated, a generally rectangular profile with one open end) into which the generally rectangular boom segment 134 can be inserted (and secured in various ways). As another example, cross-sections of any of the coupling segments 132, 144, 146, and 148 can be configured as a square, a rectangle, a non-squared diamond, a circle, a generally elliptical shape, or a generally oval shape (e.g., as depicted in FIGS. 5A through 5H). In some embodiments, the cross-section of a corresponding end of a boom segment (e.g., one of the boom segments 134, 136, 138 or 140) can then be configured with a similar (or different) geometry.

As depicted in FIGS. 10 and 11, the coupling segments 144, 146 and 148 can be inserted into the ends of the various boom segments 136, 138, and 140. In some embodiments, an opposite configuration is possible. As illustrated for the boom segment 134 and the coupling segment 132, for example, the end of a boom segment can instead be inserted into the corresponding coupling segment. In some embodiments, an intermediary connector (not shown) can be used between the boom segments 134, 136, 138, and 140 and the relevant coupling segment 132, 148, 144, or 146. For example, in some embodiments, the boom segments 134, 136, 138, and 140 and the coupling segments 132, 144, 146, and 148 are configured with similar peripheral dimensions. Collars (not shown) can then be disposed between the relevant pairs of the boom segments 134, 136, 138, and 140 and the coupling segments 132, 144, 146, and 148, with opposing male connectors of each collar extending into (or opposing female connectors receiving) the relevant boom segment 134, 136, 138, or 140 and the corresponding coupling segment 132, 144, 146, or 148. In this regard, in some embodiments, such a collar can be viewed as forming part of a coupling segment of a union, even if the collar and the union are formed as separate pieces.

As also discussed above, the example coupling segments 132, 144, 146, and 148 are formed as hollow bodies. In some embodiment, the entire lengths of the coupling segments 132, 144, 146, and 148 can be hollow. In some embodiments, only part of the lengths (e.g., only the ends) of the coupling segments 132, 144, 146, and 148 may be hollow, or the coupling segments 132, 144, 146, and 148 are generally hollow, but with some amount of internal structure (e.g., internal ribs, struts, filling, and so on).

In order to allow the boom segments 24 and 26 to pivot relative to each other the union parts 130*a* and 130*b* some embodiments include complementary hinge components. As illustrated in FIGS. 10 and 11, for example, the union part 130*a* can include hinge tabs 150 and 152, which are connected by a hinge pin extending along a hinge axis 168 (see FIG. 10) to complementary hinge tabs 154 and 156 on the union part 130*b*. In other embodiments, other hinged arrangements can alternatively (or additionally) be used.

In some embodiments, the union parts 130*a* and 130*b* can be mechanically fastened to one another at locations other than along the hinge axis 118. For example, detents, pins, catches, press- or snap-fit features, or other arrangements can be disposed to help hold the union parts 130*a* and 130*b* together when the union 130 is in the fully closed orientation. As illustrated in FIG. 8, tabs 160 and 162 on the union part 130*a* can be configured for press-fit (or other) engagement with complimentary cavities 164 and 166 of the union part 130*b*. When the union 130 is in the fully closed orientation (e.g., as depicted in FIG. 10) the tabs 120 can engage the cavities 122, in order to help resist unintended opening of the union 130 and corresponding folding of the boom 22. In some embodiments, the configuration of the tabs 160 and 162 and the cavities 164 and 166 can be useful to provide for break-away movement of the boom wing 28, such that rearward impacts on the end of the boom 22 (e.g., during forward travel of the sprayer vehicle 20) can be absorbed via pivoting of the boom 22 at the joint 32.

Regarding example materials for these aforementioned booms, the horizontal boom segments such as 42, 44, 46, 94, and so on are made of carbon fiber. In some embodiments, the vertical union members are also made of carbon fiber. In other embodiments, the vertical union members are made of a molded composite material such as a thermoset or thermoplastic polymer, optionally reinforced with fibers such as fiberglass, carbon fiber or Kevlar. For example, the union pieces are fiber reinforced molded with either thermoplastic or thermoset matrix material on dedicated tooling. The molding process includes compression molding, injection molding or reaction injection molding.

In some embodiments, the horizontal boom segments such as 42, 44, 46, 94, etc., are made of fiber materials by either a manual hand lay or wrap process or by a pultrusion process. In a manual process, the boom segments are made of multiple layers of carbon fiber (e.g. 16 to 20 layers). For instance, there are two to four alternating layers where the fibers are oriented non-parallel (off-axis) to the long central axis of the boom segments. The fibers in the middle layers are oriented parallel to the long central axis of the boom segments. There are 14-18 middle layers with the fibers oriented on-axis. Axial fibers run parallel to the length of the boom segment. The middle layers are followed by two to four alternating layers where the fiber is oriented off axis again. The fibers in the off axis layers are oriented from 30 degree to 60 degrees relative to the central long axis. For example, the first and third layers have fibers oriented at +45 degrees, while the second and fourth layers have fibers oriented at −45 degrees. The number of layers of material of the different boom segments can vary depending on the strength needed in various locations along the entire boom. As another example, the layers can increase or be thicker near the boom joint articulation regions where reinforcements may be needed.

In an example pultrusion process, the boom segments are again made up of multiple layers of carbon fiber or fiber composite or fiber reinforced composite material. The content of the fibers is such that there are about 10-20% alternating off axis fibers, followed by 60-80% on-axis fibers, followed by 10-20% alternating off axis fibers. Although there may not be distinct layers like in the manual process, a concept of layers is still useful to describe the boom segments made in pultrusion process. Thus again, there are two to four alternating layers where the fibers are oriented non-parallel (off-axis) to the long central axis of the boom segments. The fibers in the middle layers are oriented parallel to the long central axis of the boom segments. There are 14-18 middle layers with the fibers oriented on-axis. Axial fibers run parallel to the length of the boom segment. The middle layers are followed by two to four alternating layers where the fiber is oriented off axis again. Alternating refers to the fibers being oriented in different directions in alternating layers of the boom segments such as 42, 44, 46, 94, etc.

To bond the material or boom segments together, in some embodiments, adhesives are used in conjunction with a mechanical fastening method (e.g. bolting, strapping together). When using an adhesive to secure the coupling segments, the adhesives include plural component epoxies, acrylics, or polyurethanes. In the case of a two-part epoxy, an epoxy and a hardener is mixed in for curing. In some embodiments, a first epoxy layer may be applied to one surface, followed by a different layer that is applied to the other surface that is to be attached to the first surface. Alternatively, an epoxy mixture or slurry is formed and applied to each surface. If the boom segments or area to be joined together are covered by a surface that is not conducive to adhesive bonding, such as having a mold release agent, one surface preparation method includes mechanical abrasion followed by solvent cleaning before applying the epoxy. In some embodiments, vent holes or pin apertures are first created in the material before adhesively bonding the pieces together. The holes allow the release of trapped air to avoid the solid pieces from pushing apart or forming a poorer bond when the adhesive is cured and any air may bubbles expand. After curing and drying, some of the vent holes may be used as sites to fasten (e.g. bolt, cable) the boom segments together.

Forming various booms from fiber or composite materials reduces the weight of the spray booms relative to a construction made of steel or even lighter metals, such as aluminum. However, fiber or composite materials have lower electrical conductivity than metals. For example, some fiber materials can exhibit electrical conductivity of approximately 104/Sm 20° C. as compared to approximately 107/Sm at 20° C. for aluminum. Accordingly, use of fiber or composite materials can lead to issues with electrostatic buildup and discharge for the relevant boom. For example, the constant external rubbing of leaves from tall crops against the relevant boom or the existence of very dry air may potentially cause an electrostatic problem. Aluminum or steel boom assemblies can often easily dissipate such charge and thereby not be affected by crop leaves and dry air. However, the lower conductivity of fiber or composite materials can mean that fiber or composite booms cannot as easily dissipate the charge. Accordingly, electrons can build up on the surface of a composite or fiber boom and cause the spray pattern to be altered or present potential dangers in the proximity of fuel tanks or reactive chemicals.

In some embodiments according to this disclosure, fiber or composite sprayer booms are coated with an electrically conductive material or a metallic paint. Being made of modular segments, the joints, sections, dowels, hinges, etc., are small enough that they can be readily coated in a small bath or spray duster. When the components are joined together to form a boom, they are in electrical contact with one another to be able to readily dissipate electric charge to the metallic centerframe or to the metallic vehicle. Alternatively (or additionally), various boom segments can be dipped in a liquid bath having a composition that includes a metallic portion or that is otherwise at least partly electrically conductive. Such a bath can coat both the inside and outside of the boom segments with the metallic or otherwise electrically conductive composition. As another option, which can help to reduce the relevant manufacturing time, stripes (e.g., a stripe 170, as illustrated in FIG. 12) or rivers or other patterns of electrically conductive paint or material can be painted onto portions of a boom. Such patterns can be configured to direct electrostatic buildup towards a center frame of a boom or towards the body or frame of a vehicle or platform that carries the boom. Because such vehicles or platforms can typically include substantial metallic portions, this can further help to dissipate the electrostatic build up. Further, where a spray boom is composed of boom segments, adjacent sections can be connected to one another with hinges, pins or links that are metallic, which can help to provide a relatively continuous conductive path to aid the electrostatic discharge.

In some embodiments, as an alternative (or in addition) to paint, conductive or metallic strips or metallic tape are attached to the surface of a boom (e.g. inside and outside of the boom) using conductive adhesive or epoxy, in order to create electrically conductive paths or regions on the surface of the boom. In some embodiments, the metallic strips are run across the length of the boom and epoxy or some other adhesive bonder coats, say, the lower third and top third of the under side of the strips. The metallic strips then bond to the fiber boom with the middle third of the under side of the strips still in physical direct contract of the boom surface. But now the metallic strips are well glued to the boom surface without any free or dangling edges that may cause the metallic strips to be brushed off. In some embodiments, the epoxy or adhesive are conductive as well (e.g. metal glue), in which case the metallic strip then forms a good conductive bond to the surface of the boom. In some embodiments, metallic straps (e.g., straps 172, as illustrated in FIG. 12) are mounted across adjacent boom segments or segments (e.g. from a breakaway section, to an outer wing section, to an inner wing section, to a center frame, and then to the relevant vehicle or platform) in order to connect electrically conductive paths from one boom section to another. Such metallic straps can include, for example, electrically conductive (e.g. metal) rivets, snaps, screws, or other connectors on both ends of the straps, each of which can be mounted, screwed, snapped, or otherwise connected to an electrically conductive section on respective adjacent boom segments.

The electrostatic solutions can be applied to a variety of non-metallic boom structures whether they are articulated or not. For instance, they can be applied to the boom depicted in FIGS. 1A and 2 or to the booms depicted in U.S. Provisional Patent Application 62/035,536.

In some embodiments, to help to structurally support a composite boom, the boom be formed from both metallic and fiber or composite material portions. Where the non-metallic sections are isolated without having an electrical path, straps or paint or coated sections (e.g., as discussed above) can be used to provide an appropriate conductive path. Generally, spray booms are accompanied by plumbing or flow tubes that carry the liquid to be sprayed. To further counter any electrostatic problems, such plumbing and tubes can be also be electrically-conductive coated or striped on the outside, or strapped (e.g., as discussed above).

Finally, the orientation and directions stated and illustrated in this disclosure should not be taken as limiting. Many of the orientations stated in this disclosure and claims are with reference to the direction of travel of the equipment (e.g. rearward is opposite the direction of travel). But, the directions, e.g. “behind” are merely illustrative and do not orient the embodiments absolutely in space. That is, a structure manufactured on its “side” or “bottom” is merely an arbitrary orientation in space that has no absolute direction. Also, in actual usage, for example, the boom equipment may be operated or positioned at an angle because the implements may move in many directions on a hill; and then, “top” is pointing to the “side.” Thus, the stated directions in this application may be arbitrary designations.

The description of the present disclosure has been presented for purposes of illustration and description, but is not intended to be exhaustive or limited to the disclosure in the form disclosed. Explicitly referenced embodiments herein were chosen and described in order to explain the principles of the disclosure and their practical application. Accordingly, various implementations other than those explicitly described are within the scope of the claims.

What is claimed is:

1. A boom system for a work vehicle, comprising:

a first boom member having a plurality of first boom segments aligned lengthwise to extend along a first boom dimension;

a second boom member having a plurality of second boom segments aligned lengthwise to extend in the first boom dimension and spaced apart from the first boom member in a second boom dimension;

a union spanning the second, boom dimension to couple the first boom member to the second boom member and having, a first coupling segment joining consecutive first boom segments together and a second coupling segment joining consecutive second boom segments together;

wherein the first and second boom segments are hollow at least at their ends; and wherein the first and second coupling segments of the union are received in the ends of the respective first and second boom segments.

2. The boom system of claim 1; wherein the first coupling segment of the union extends in the first boom dimension in line with the first boom segments; and
Wherein the second coupling segment of the union extends in the first boom dimension in line with the second boom segments.

3. A boom system for a work vehicle, comprising:
a first boom member having a plurality of first boom segments aligned lengthwise to extend along a first boom dimension;
a second boom member having a plurality of second boom segments aligned lengthwise to extend in the first boom dimension and spaced apart from the first boom member in a second boom dimension;
a union spanning the second boom dimension to couple the first boom member to the second boom member and having a first coupling segment joining consecutive first boom segments together and a second coupling segment joining consecutive second boom segments together;
wherein the boom system comprises over 90 percent non-metallic material;
wherein the first and second boom segments are hollow at least at their ends; and
wherein the first and second coupling segments of the union are received in the ends of the respective first and second boom segments.

4. The boom system of claim 1, wherein the ends of the first and second boom segments have a hollow geometric cross-section; and
wherein the first and second coupling segments have a geometric cross-section complementing the hollow geometric cross-section of the first and second boom segments and mounted coaxially in the respective first and second boom segments.

5. The boom system of claim 4, wherein the geometric cross-section of the first and second boom segments is one of a rectangle, a diamond, a circle, an ellipse, an oval.

6. The boom system of claim 1, wherein the first boom member comprises an elongated lower tubular boom member and a geometric cross-section of the tubular boom member is a diamond oriented with respect to a ground plane.

7. The boom system of claim 4, further including a fastener securing the first and second boom segments to the respective first and second coupling segments;
wherein the fastener includes at least one of an adhesive, a threaded fastener, and a rivet.

8. The boom system of claim 1, wherein the first and second boom segments and the union are made of at least one of a polymer, a graphite, a non-ferrous metal including aluminum and aluminum alloy, and a composite fiber material including carbon fiber, flax fiber and fiberglass.

9. The boom system of claim 1, wherein the union has a strut at opposite ends of which; are the first and second coupling segments; and
wherein the strut is straight and extends substantially perpendicularly with respect to both of the first and second boom members.

10. The boom system of claim 1, wherein the union has a strut, at opposite ends of which are the first and second coupling segments; and
wherein the strut extends substantially non-perpendicularly with respect to both of the first and second boom members.

11. The boom system of claim 10, wherein the strut is arcuate at least in part between its ends.

12. The boom system of claim 1, wherein the union has a strut at opposite ends of which are the first and second coupling segments and which forms a support beam having a cross-section in the shape of one of an I, an L, a T, a U, an X and a Y.

13. The boom system of claim 1, further including an electrically conductive material applied to one or more of the union and the first and second boom segments.

14. The boom system of claim 13, wherein the electrically conductive material is at least one of a metallic paint, coating, tape, stripe or strap.

15. The boom system of claim 1, wherein the union is hinged to pivotally couple the consecutive first boom segments together and to couple the consecutive second boom segments together.

16. The boom system of claim 15, wherein the union has mating first and second parts pivotally connected along a hinge axis, each of the first and second parts defining a strut at opposite ends of which are first and second one-sided coupling segments for mating with one first boom segment and one second boom segment, respectively.

17. The boom system of claim 16, wherein the strut of each of the first and second parts of the union form beam parts; and
wherein when the first and second parts are hinged together the beam parts combine to form a combined strut beam.

18. The boom system of claim 17, wherein the first and second parts are mechanically fastened to one another at one or more locations along the struts other than along the hinge axis.

19. A boom system for a work vehicle, comprising:
a first boom wing having spaced apart upper and lower boom members each with a plurality of segments aligned lengthwise to extend along a first boom dimension; and
a second boom wing having spaced apart upper and lower boom members each with a plurality of segments aligned lengthwise to extend along the first boom dimension;
wherein each of the first and second boom wings have a plurality of unions spaced apart in the first boom dimension and spanning a second boom dimension to couple the upper and lower boom members of the associated first and second boom wing;
wherein, in each of the first and second boom wings, at least one of the plurality of unions has a strut at opposite ends of which are upper and lower coupling segments, the upper coupling segments being disposed in line with consecutive segments of the upper boom member and the lower coupling segments being disposed in line with consecutive segments of the lower boom member; and
wherein, in each of the first and second boom wings, at least one of the plurality of unions has a hinge part defining a strut at opposite ends of which are upper and lower one-sided coupling segments, the upper one-sided coupling segment coupling one of the segments of the upper boom member and the lower one-sided coupling segment coupling one of the lower boom segments, the hinge parts of the first and second boom wings being coupled along a hinge axis so as to pivotally couple the first and second boom wings.

20. The boom system of claim 19, wherein the segments and the unions are made of at least one of a polymer, graphite, a non-ferrous metal including aluminum and aluminum alloy, and a composite fiber material including carbon fiber, flax fiber and fiberglass.

21. The boom system of claim 1, wherein the first boom member and the second boom member form part of a boom wing.

22. The boom system of claim 1, wherein the first boom segment and the second boom segment comprise pultruded fiber material, and wherein fibers are oriented off-axis and on-axis relative to a central axis of the first and second boom segments.

23. The boom system of claim 1, wherein the first boom segment and the second boom segment comprise pultruded fiber material, and wherein the union comprises fiber reinforced molded material.

24. The boom system of claim 1, wherein the first boom segment and the second boom segment have vent holes at adhesively joined-together surfaces.

25. The boom system of claim 1, wherein the first boom segment and the second boom segment have a multi-part epoxy at adhesively joined-together surfaces.

* * * * *